(12) United States Patent
Ramakrishna

(10) Patent No.: US 12,339,768 B2
(45) Date of Patent: Jun. 24, 2025

(54) MEMORY CONTROLLER AND RELATED METHODS FOR IMPLEMENTING AN ADDRESS-BASED DYNAMIC PAGE CLOSE POLICY

(71) Applicant: Microsoft Technology Licensing, LLC, Redmond, WA (US)

(72) Inventor: Mukund Ramakrishna, Austin, TX (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 110 days.

(21) Appl. No.: 18/467,221

(22) Filed: Sep. 14, 2023

(65) Prior Publication Data

US 2025/0094328 A1 Mar. 20, 2025

(51) Int. Cl.
*G06F 12/00* (2006.01)
*G06F 12/02* (2006.01)

(52) U.S. Cl.
CPC .. *G06F 12/0215* (2013.01); *G06F 2212/1024* (2013.01); *G06F 2212/655* (2013.01)

(58) Field of Classification Search
CPC ......... G06F 12/0215; G06F 2212/1024; G06F 2212/655
See application file for complete search history.

(56) References Cited

U.S. PATENT DOCUMENTS

| | | | |
|---|---|---|---|
| 6,799,241 B2 | 9/2004 | Kahn et al. | |
| 2004/0123067 A1* | 6/2004 | Sprangle | G06F 13/1631 711/219 |
| 2009/0055570 A1* | 2/2009 | Madrid | G06F 13/161 711/E12.001 |
| 2012/0059983 A1 | 3/2012 | Nellans et al. | |
| 2014/0379987 A1 | 12/2014 | Aggarwal | |
| 2020/0409597 A1* | 12/2020 | Ganesh | G06F 3/0659 |
| 2021/0034539 A1* | 2/2021 | Roberts | G06F 12/0897 |

OTHER PUBLICATIONS

International Search Report and Written Opinion received for PCT Application No. PCT/US2024/041383, Oct. 14, 2024, 15 pages.

(Continued)

*Primary Examiner* — John A Lane
(74) *Attorney, Agent, or Firm* — Ranjeev Singh; Singh Law, PLLC

(57) ABSTRACT

Memory controllers and related methods for implementing an address-based dynamic page close policy are described. An example method includes using a first tracker, having entries indexed by a hash of system memory addresses for a physical memory region, tracking page hits associated with the physical memory region to develop a historical record of page hits to the physical memory region. The method further includes using a second tracker, having entries indexed by a hash of system memory addresses for the physical memory region, tracking page hits to the physical memory region to develop a current record of page hits to the physical memory region. The method further includes predicting whether to close a page or keep the page open based on a comparison of the historical record of page hits to the physical memory region with the current record of page hits to the physical memory region.

20 Claims, 6 Drawing Sheets

(56) References Cited

OTHER PUBLICATIONS

Suri, et al., "Adaptive and Scalable Predictive Page Policies for High Core-Count Server CPUs", SAT 2015, 18th International Conference, Austin, TX, USA, Sep. 24-27, 2015, Lecture Notes in Computer Science, Springer, Berlin, Heidelberg, Mar. 4, 2017, pp. 99-110.

Mutlu, et al., "Stall-Time Fair Memory Access Scheduling for Chip Multiprocessors", In Proceedings of 40th Annual IEEE/ACM International Symposium on Microarchitecture, Dec. 1, 2007, 13 Pages.

Volos, et al., "BuMP: Bulk Memory Access Prediction and Streaming", In Proceedings of 47th Annual IEEE/ACM International Symposium on Microarchitecture, Dec. 13, 2014, pp. 1-13.

* cited by examiner

USING A FIRST TRACKER, HAVING ENTRIES INDEXED BY A HASH OF SYSTEM MEMORY ADDRESSES FOR A PHYSICAL MEMORY REGION OF A MEMORY SYSTEM, TRACKING PAGE HITS ASSOCIATED WITH THE PHYSICAL MEMORY REGION TO DEVELOP A HISTORICAL RECORD OF PAGE HITS TO THE PHYSICAL MEMORY REGION
510

USING A SECOND TRACKER, DIFFERENT FROM THE FIRST TRACKER, HAVING ENTRIES INDEXED BY A HASH OF SYSTEM MEMORY ADDRESSES FOR THE PHYSICAL MEMORY REGION, TRACKING PAGE HITS TO THE PHYSICAL MEMORY REGION TO DEVELOP A CURRENT RECORD OF PAGE HITS TO THE PHYSICAL MEMORY REGION
520

PREDICTING WHETHER TO CLOSE A PAGE OR KEEP THE PAGE OPEN BASED ON A COMPARISON OF THE HISTORICAL RECORD OF PAGE HITS TO THE PHYSICAL MEMORY REGION WITH THE CURRENT RECORD OF PAGE HITS TO THE PHYSICAL MEMORY REGION
530

USING A FIRST TRACKER, HAVING ENTRIES INDEXED BY A HASH OF SYSTEM MEMORY ADDRESSES FOR THE PHYSICAL MEMORY REGION, TRACKING PAGE HITS ASSOCIATED WITH THE PHYSICAL MEMORY REGION TO DEVELOP A HISTORICAL RECORD OF PAGE HITS TO THE PHYSICAL MEMORY REGION
610

USING A SECOND TRACKER, DIFFERENT FROM THE FIRST TRACKER, HAVING ENTRIES INDEXED BY A HASH OF THE SYSTEM MEMORY ADDRESSES FOR THE PHYSICAL MEMORY REGION, TRACKING PAGE HITS TO THE PHYSICAL MEMORY REGION TO DEVELOP A CURRENT RECORD OF PAGE HITS TO THE PHYSICAL MEMORY REGION
620

USING A THIRD TRACKER, DIFFERENT FROM THE FIRST TRACKER AND THE SECOND TRACKER, TRACKING PAGE HITS RELATED TO SYSTEM MEMORY ADDRESSES NOT HAVING AN INDEXED ENTRY INTO THE FIRST TRACKER
630

SETTING A THRESHOLD EQUAL TO A VALUE OF THE ENTRY IN THE FIRST TRACKER IF THERE IS AN ENTRY IN THE FIRST TRACKER HAVING ENTRIES INDEXED BY THE HASH OF THE SYSTEM MEMORY ADDRESSES FOR THE PHYSICAL MEMORY REGION, OTHERWISE SETTING THE THRESHOLD EQUAL TO A VALUE OF THE THIRD TRACKER
640

PREDICTING WHETHER TO CLOSE THE PAGE OR KEEP THE PAGE OPEN BASED ON A COMPARISON OF THE THRESHOLD WITH THE CURRENT RECORD OF PAGE HITS TO THE PHYSICAL MEMORY REGION
650

MEMORY CONTROLLER AND RELATED METHODS FOR IMPLEMENTING AN ADDRESS-BASED DYNAMIC PAGE CLOSE POLICY

BACKGROUND

The performance of the main memory (e.g., dynamic random access memory (DRAM)) of a computing system depends on several aspects, including the organization of the memory and the policies used for managing the content stored in the memory. The memory (e.g., the DRAM) may be organized in the form of pages. The size of each page may vary from 2 KB to 4 KB. At a given time, the DRAM pages can be in an open state or a closed state.

If the page is available in the row buffer associated with the DRAM, then the page is considered to be in an open state. This is because a request to access the data associated with the open page can be performed by simply issuing a column address select (CAS) command to the media. In this instance, the memory access would result in a page hit. On the other hand, if the page is in a closed state, then there could be two scenarios-page empty or page conflict. Since multiple DRAM pages may map to the same physical DRAM bank, a page empty scenario corresponds to the case when the page is not open in the targeted bank and the request will require an activate (ACT) command to load the page, and then a CAS command to read the data. Conversely, if a different page is open in the target bank, then this causes a conflict. Thus, this scenario is referred to as the page conflict scenario since the memory controller would first need to close the existing page (e.g., using a precharge command) and then proceed as it would have in the page empty scenario.

Because memory (e.g., DRAM) timing characteristics result in consecutive accesses to the same page at a significantly faster rate than the accesses to different pages, every incoming request would want to be a page hit to get the best possible latency. The second best condition would be to end up with a page empty scenario. A page conflict scenario would be the worst possible scenario with respect to the latency associated with the memory request. Accordingly, there is a need for better page close policies for memory systems, including for DRAM-based memory systems.

SUMMARY

In one example, the present disclosure relates to a method for implementing a dynamic page close policy for a physical memory region of a memory system. The method may include using a first tracker, having entries indexed by a hash of system memory addresses for the physical memory region, tracking page hits associated with the physical memory region to develop a historical record of page hits to the physical memory region.

The method may further include using a second tracker, different from the first tracker, having entries indexed by a hash of system memory addresses for the physical memory region, tracking page hits to the physical memory region to develop a current record of page hits to the physical memory region. The method may further include predicting whether to close a page or keep the page open based on a comparison of the historical record of page hits to the physical memory region with the current record of page hits to the physical memory region.

In another example, the present disclosure relates to a memory controller for implementing a dynamic page close policy for a physical memory region of a memory system. The memory controller may include a first tracker, having entries indexed by a hash of system memory addresses for a physical memory region, to track page hits associated with the physical memory region to develop a historical record of page hits to the physical memory region.

The memory controller may further include a second tracker, different from the first tracker, having entries indexed by a hash of system memory addresses for the physical memory region, to track page hits to the physical memory region to develop a current record of page hits to the physical memory region. The memory controller may further include a predictor to predict whether to close the page or keep the page open based on a comparison of the historical record of page hits to the physical memory region with the current record of page hits to the physical memory region.

In yet another example, the present disclosure relates to a method for implementing a dynamic page close policy for a physical memory region of a memory system. The method may include using a first tracker, having entries indexed by a hash of system memory addresses for the physical memory region, tracking page hits associated with the physical memory region to develop a historical record of page hits to the physical memory region. The method may include using a second tracker, different from the first tracker, having entries indexed by a hash of the system memory addresses for the physical memory region, tracking page hits to the physical memory region to develop a current record of page hits to the physical memory region.

The method may further include using a third tracker, different form the first tracker and the second tracker, tracking page hits related to system memory addresses not having an indexed entry into the first tracker. The method may further include setting a threshold equal to a value of the entry in the first tracker if there is an entry in the first tracker having entries indexed by the hash of the system memory addresses for the physical memory region, otherwise setting the threshold equal to a value of the third tracker. The method may further include predicting whether to close the page or keep the page open based on a comparison of the threshold with the current record of page hits to the physical memory region.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

FIG. 5 shows a flow chart of an example method for implementing the address-based dynamic page close policy; and FIG. 6 shows a flow chart of another example method for implementing the address-based dynamic page close policy.

DETAILED DESCRIPTION

Figure 1:
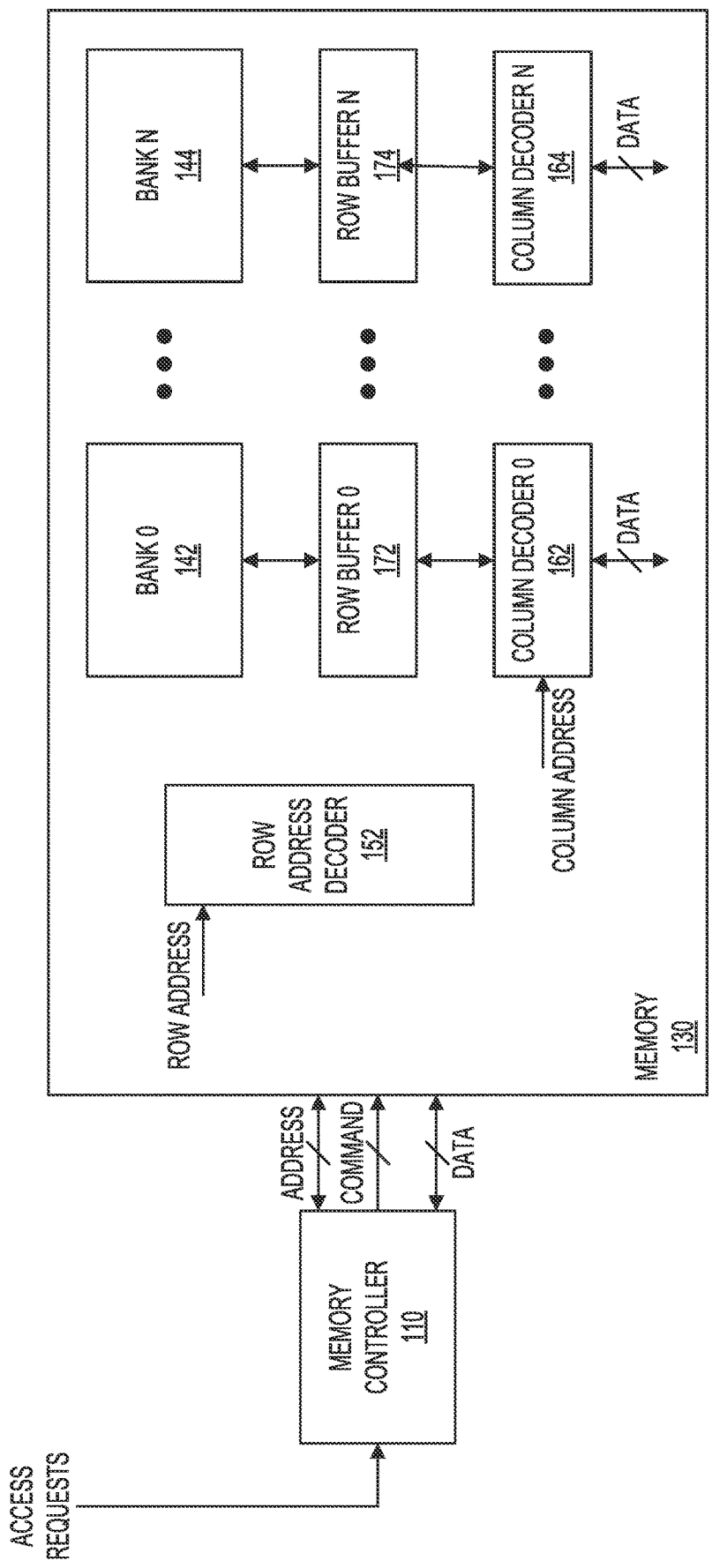
FIG. 1 is a block diagram of an example memory system in which address-based dynamic page close policy is implemented.

Examples described in this disclosure relate to memory controllers and related methods for implementing an address-based dynamic page close policy. Certain examples relate to memory controllers associated with a computing system. The computing system may be a standalone computing system or maybe part (e.g., a server) of a public cloud, a private cloud, or a hybrid cloud. The public cloud includes a global network of servers that perform a variety of functions, including storing and managing data, running applications, and delivering content or services, such as streaming videos, electronic mail, office productivity software, or social media. The servers and other components may be located in data centers across the world. While the public cloud offers services to the public over the Internet, businesses may use private clouds or hybrid clouds. Both private and hybrid clouds also include a network of servers housed in data centers. Applications may be executed using compute and memory resources of the standalone computing system or a computing system in a data center. As used herein, the term "application" encompasses, but is not limited to, any executable code (in the form of hardware, firmware, software, or in any combination of the foregoing) that implements a functionality, a virtual machine, a client application, a workload, a service, a micro-service, a container, or a unikernel for serverless computing. Alternatively, applications may be executing on hardware associated with an edge-compute device, on-premises servers, or other types of systems, including communications systems, such as base stations (e.g., 5G or 6G base stations).

The memory (e.g., DRAM) associated with a computing system may be organized in the form of pages. The size of each page may vary from 2 KB to 4 KB. The DRAM pages can be in an open state or a closed state. If the page is available in the row buffer associated with the DRAM, then the page is considered to be in an open state. This is because a request to access the data associated with the open page can be performed by simply issuing a column address select (CAS) command to the media. In this instance, the memory access would result in a page hit. On the other hand, if the page is in a closed state, then there could be two scenarios-page empty or page conflict. Since multiple DRAM pages map to the same physical DRAM bank, a page empty scenario corresponds to the case when the page is not open in the targeted bank and the request will require an activate (ACT) command to load the page, and then a CAS command to read the data. Conversely, if a different page is open in the target bank, then this causes a conflict. Thus, this scenario is referred to as the page conflict scenario since the memory controller would first need to close the existing page (e.g., using a precharge command) and then proceed as it would have in the page empty scenario.

Because memory (e.g., DRAM) timing characteristics result in consecutive accesses to the same page at a significantly faster rate than the accesses to different pages, every incoming request would want to be a page hit to get the best possible latency. As noted earlier, the page hit relates to any read or write access to an open page. The second best condition would be to end up with a page empty scenario. In this case, the bank to be accessed is idle with no page open. Accordingly, the bank would first be activated and then the page can be accessed. A page conflict scenario would be the worst possible scenario with respect to latency associated with the memory request. In this case, the page causing the conflict must be closed in order to open the page to which the read or write access pertains to.

Memory controllers (e.g., DRAM memory controllers) may implement a page close policy to minimize the number of page conflicts for the workloads or applications of interest. The goal of these schemes is to predict when the next access to a particular bank would result in a page conflict, and pre-emptively issue the precharge command so that the next access would result in a page empty scenario, instead of a page conflict scenario. When such a prediction fails, this scenario is called an overdue page close. On the flip side, the scheme should also ensure keeping the page open to get as many successive page hits as possible. A premature closure of the page would hinder performance as it converts page hit scenarios to page empty scenarios.

Broadly speaking, these policies can be classified into static schemes and dynamic schemes. Static schemes can either choose to always keep the page open or to always close the page after every access. A static page open scheme favors workloads with page hits that are temporally co-located while the other scheme favors workloads with temporally co-located page conflicts. There are some modifications on static schemes that make the decision to keep the page open if the controller is aware of a pending hit in its request queues. The other form of a static scheme is a timer-based policy where a page is closed if no hits are received to it within a programmable period of time.

Dynamic schemes can be viewed as static schemes with built-in feedback. For example, in the static timer scenario, the timer value can be adjusted up or down based on how many premature and overdue page closes were observed in a given period of time.

Examples described herein address the limitations of the page close policies by having a feedback mechanism that takes into consideration both the memory access addresses and the feedback related to overdue page closes or premature page closes. The page close policy includes tracking page access patterns based on the physical memory region being accessed and then applying this learning to predict the number of page hits expected to the same physical memory region in the future. One example structure to perform this prediction is referred to herein as the address aware history tracker (AWHT). The AWHT can be implemented as an indexed structure including a set of counters. The index into this structure is a hashed version of the incoming request address as returned by a function hash(X) where X is the incoming address. The entries in the table are saturating counters, which are incremented as described later. The hash provides temporal locality since at a given time only a subset of the hashes would need tracking.

In addition to the address aware history tracker (AWHT), the page close policy relies upon an address unaware history tracker (UWHT), which is a fallback predictor for those cases when the hash(X), where X is the incoming address, is not present in the AWHT. In an example, the function of the UWHT is like the AWHT except that it is a single counter agnostic of the accessed address. The other distinction regarding the UWHT is that it is only incremented for page hits for accesses, which have a page miss in the AWHT.

Lastly, the page close policy implementation requires a current hit tracker (CHT), which is an indexed structure like the AWHT. The CHT uses the same hash function hash(X) as the AWHT and the counters in this structure reflect the real time count of page hits per open/active bank. The number of such trackers is a design consideration depending upon the power and the area available for implementing such trackers. As an example, a design may include a UWHT, a CHT and an AWHT per bankgroup. If the design has a higher number of the tracker instances, then it can track the history at a finer granularity at the expense of more area. The size of each counter is limited by the page size of the device. For example, if the design has 2 KB pages and each media access returns 64B, there are 32 (2 KB/64B) accesses per page.

Advantageously, the memory controller and the methods described herein result in fewer page closes for those pages that may be accessed soon after the page close, which in turn reduces power consumption and improves performance of the memory system. In other words, the memory controller and the methods described herein help improve memory performance by increasing the page hit rate. The increased page hit rate lowers the latency of memory requests. In addition, power savings can be realized by placing memory regions (e.g., banks) in idle state based on the improved dynamic page close policy.

FIG. 1 is a block diagram of an example memory system 100 in which address-based dynamic page close policy is implemented. Memory system 100 includes a memory controller 110 coupled to memory 130. Memory controller 110 may correspond to a DRAM memory controller. Memory controller 110 may receive access requests from the various requesting agents, including CPUs, GPUs, processing cores, or other requesting agents. Memory controller 110 receives such requests and issues commands associated with the access requests. The commands can include any of a number of memory-related commands. As an example, the commands may include a read command, a write command, a precharge command, an activate command, and other commands. Memory controller 110 also provides the column address and the row address to memory 130.

With continued reference to FIG. 1, memory 130 may correspond to a DRAM, and thus it may be organized with row/column-based addressing. Memory 130 can include multiple banks, which could be organized in bankgroups. Memory 130 is shown as having N banks, including bank 0 142 to bank N 144. The row address is provided to a row address decoder 152 and the column address is provided to a column decoder corresponding to the bank being accessed. Memory 130 is shown as having N column decoders, including column decoder 0 162 to column decoder N 164. Memory 130 is also shown as having N row buffers, including row buffer 0 172 to row buffer N 174. Each page may be configured to fit in a respective row buffer. Alternatively, multiple pages may be loaded into a set of row buffers. In any case, as explained earlier, each access either results in a page hit or a page miss. Although FIG. 1 shows a certain number of banks and row buffers that are arranged in a certain way, memory system 100 may include additional or fewer banks and row buffers that are arranged differently.

Figure 2:
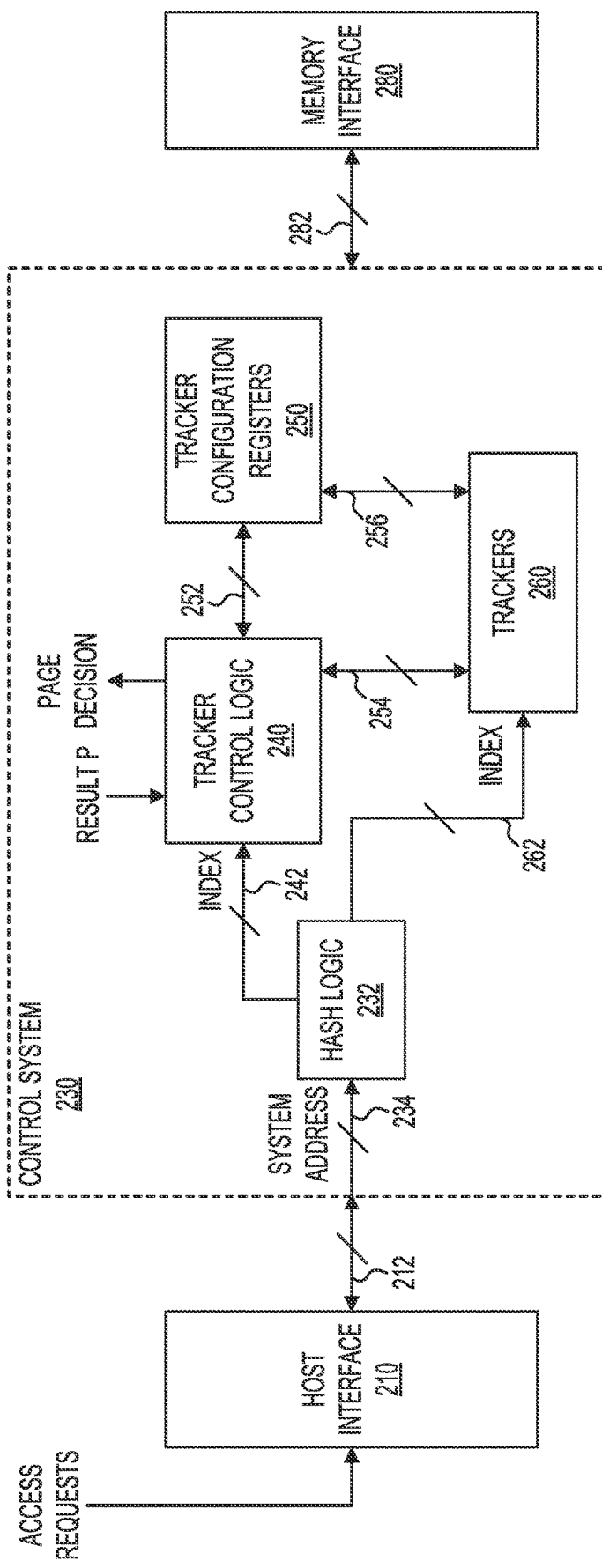
FIG. 2 is a block diagram of an example memory controller for implementing the address-based dynamic page close policy.

FIG. 2 is a block diagram of an example memory controller 200 for implementing the address-based dynamic page close policy. In one example, memory controller 200 corresponds to memory controller 110 of FIG. 1. In this example, memory controller 200 includes a host interface 210, a control system 230, and a memory interface 280. Host interface 210 is coupled to control system 230 via bus 212. Control system 230 is coupled to memory interface 280 via bus 282. Host interface 210 includes circuitry to receive requests from the various requesting agents, including CPUs, GPUs, processing cores, or other requesting agents. Control system 230 is shown with aspects that are relevant for implementing the address-based dynamic page close policy. Memory controller 200 may also include other functional blocks, including circuitry for generating the various commands (e.g., the various DRAM commands) and other circuitry for generating the signals to enable read/write operations. Moreover, memory controller 200 may include other circuitry related to transaction management, arbitration, and other functionality associated with a memory controller, such as a DRAM controller.

With continued reference to FIG. 2, in this example, control system 230 includes hash logic 232, tracker control logic 240, tracker configuration registers 250, and trackers 260. Tracker control logic 240 is coupled via a bus 252 to tracker configuration registers 250. Tracker control logic 240 is coupled via a bus 254 to trackers 260. Tracker configuration registers 250 are coupled via a bus 256 to trackers 260. System memory addresses received as part of a memory read/write request are provided to hash logic 232 via bus 234. Hash logic 232 includes hash circuitry to apply a hash function to the received system memory address. The generated hash is used as an index for any trackers maintained as part of trackers 260. The index is provided via bus 242 to tracker control logic 240. The index is also provided via bus 262 to trackers 260. The hash function may be implemented at the system memory address level or further down the decoding chain. As an example, the hash function may be applied at a per bank level using just the bank address. The term system memory address includes either the complete system memory address (e.g., all of the address bits that are being fed to the memory controller) or only a portion (e.g., a subset of the address bits that are being fed to the memory controller) of the system memory address.

The specific implementation of the hash function will depend on the workload and other characteristics of the memory system in which the trackers are being implemented. An example implementation would rely on using a subset of the address bits (e.g., bankgroup bits) which are used to index the DRAM page. To save area, the design may choose to use a hash function where multiple pages can be indexed into the same entry. One example hash function may include performing an XOR operation on various groups of the address bits. The hash function may be varied by choosing different subsets of the address bits to XOR or by reversing subsets of the address bits before subjecting them to the XOR operation. Complex hash functions may provide better performance at the expense of the complexity and the area for implementing such hash functions.

Still referring to FIG. 2, tracker control logic 240 is used to implement the decision-making logic for the address-based dynamic page close policy. Tracker control logic 240 may be implemented using finite state machines or other control logic to implement the predictor-related functionality described with respect to the flow charts in FIGS. 3 and 4. As explained earlier, the memory access may result in a page hit or a page miss. Tracker control logic 240 is configured to receive any such result P (a page hit or a page miss) of a memory access. Tracker control logic 240 is also configured to provide a predicted page decision, which is used by memory controller 200 to either close the page or keep it open. Tracker configuration registers 250 can be used to configure the number of trackers, as needed. In addition, the size of the physical memory region that each tracker is responsible for is also configurable. A tracker with a smaller number of entries would take up less space, but may not be as robust to variance in the application behavior with respect to the tracked physical memory region. On the other hand, a tracker with a larger number of entries would take up more space, but may be more robust to the variance in the application behavior. The application or the workload behavior could be used to guide in configuring the trackers.

Trackers 260 include an address aware history tracker (AWHT), an address unaware history tracker (UWHT), and a current hit tracker (CHT). The AWHT can be implemented as an indexed structure including a set of counters. The index into this structure is a hashed version of the incoming request address as returned by a function hash(X) where X is the incoming address. The entries in the table are saturating counters which are incremented as described later. The address unaware history tracker (UWHT) is a fallback predictor for those cases when the hash(X), where X is the incoming address, is not present in the AWHT. In an example, the function of the UWHT is like the AWHT except that it is a single counter agnostic of the accessed address. The other distinction regarding the UWHT is that it is only incremented for page hits that are a miss in the AWHT. The current hit tracker (CHT) is an indexed structure like the AWHT. The CHT uses the same hash function hash(X) as the AWHT and the counters in this structure reflect the real time count of page hits per open/active bank. Table 1 below shows example trackers that may be implemented for a physical memory region (e.g., a bank, a bankgroup, or a rank). The index column corresponds to the values generated by hashing the system memory address. The AWHT column corresponds to the values of the AWHT counter for a given index value. There is only one UWHT counter value for all of the indexed entries for the corresponding AWHT counter values and the CHT counter values. The CHT column corresponds to the value of the CHT counter for a given index value.

TABLE 1

| INDEX | AWHT | CHT |
|---|---|---|
| Hash(A) | VALUE 1 | VALUE 1 |
| Hash(B) | VALUE 2 | VALUE 2 |
| Hash(C) | VALUE 3 | VALUE 3 |
| ... | ... | ... |
| Hash(X) | VALUE 24 | VALUE 24 |
| Hash(Y) | VALUE 25 | VALUE 25 |
| Hash(Z) | VALUE 26 | VALUE 26 |

Although Table 1 shows the same number of entries for the AWHT and the CHT, they may not have the same number of entries. In general, there will be more entries in the AWHT column than the CHT column. This is because the CHT is used to track the pages that are currently open, which will be limited by the number of banks. On the other hand, the AWHT keeps track of the history, which will be referenced for future accesses. The number of entries per AWHT is a tradeoff between performance and the area for implementing the AWHT. In addition, the data structure for creating trackers may be an indexed table, multiple tables, or other types of indexed data structures that can be used for finding an entry based on an index.

With continued reference to FIG. 2, in terms of the operation of memory controller 200, when a new access request is received by the memory controller 200, it decodes the system memory address to determine the bank and page that is being targeted. Memory controller 200 then looks up a structure (e.g., a page table or a set of page tables) to determine the status of the bank. The status of the bank may result in one of the three scenarios described earlier: page hit, page empty, or page conflict. As part of the pipeline, an additional stage is added to query the predictor whether to close the page. The predictor is queried with the current bank and page information. The response of this query to the predictor is true or false, where the true response translates to a request to close the page while the false response relates to leaving the page as-is. Additional details of the functionality associated with the memory controller for implementing the address-based dynamic page close policy are provided with respect to FIGS. 4 and 5. Although FIG. 2 shows memory controller 200 as having a certain number of components that are arranged in a certain way, memory controller 200 may include additional or fewer components that are arranged differently.

Figure 3:
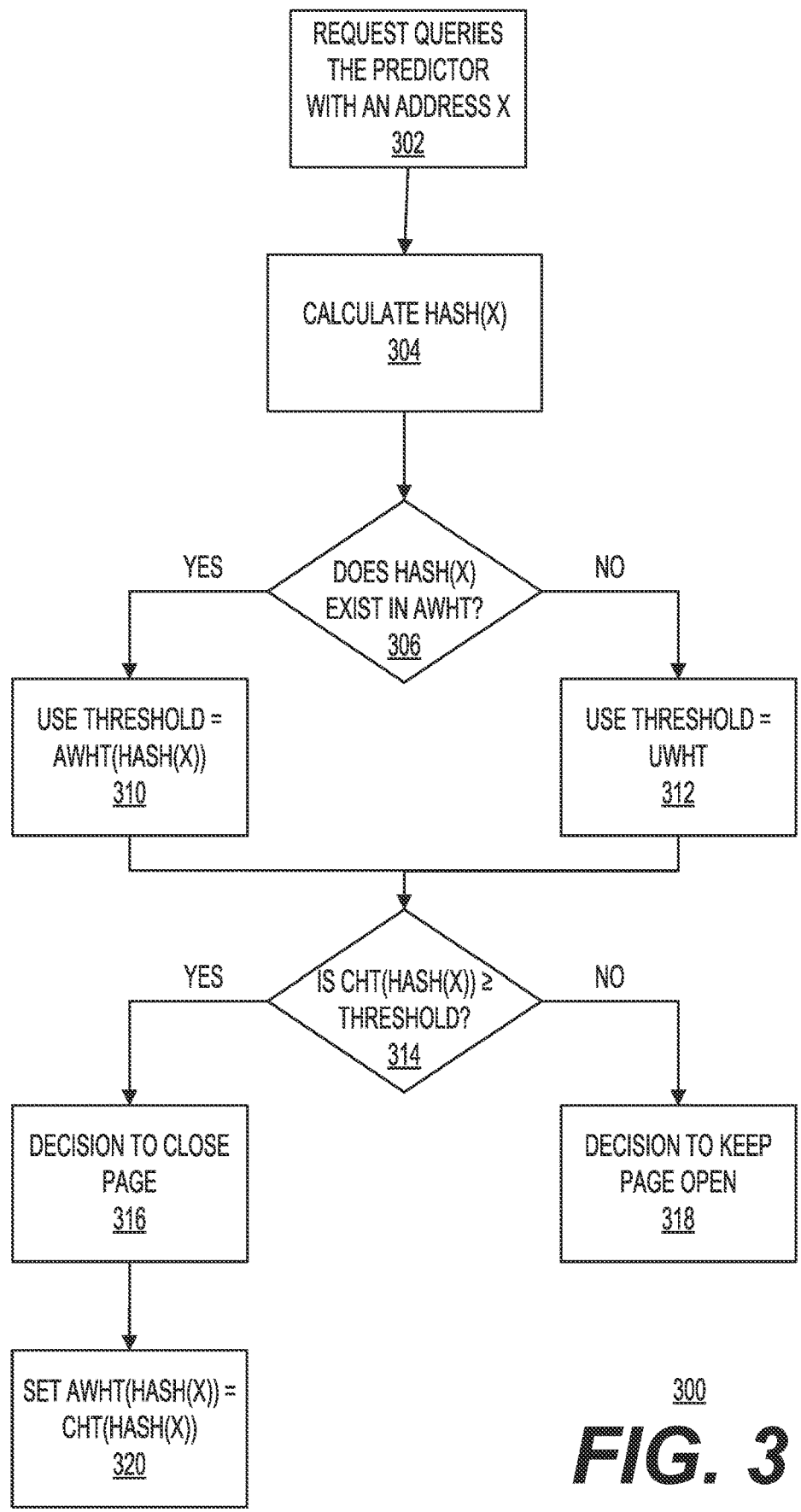
FIG. 3 shows a predictor query flow for implementing the address-based dynamic page close policy in accordance with one example.

FIG. 3 shows a predictor query flow 300 for implementing the address-based dynamic page close policy in accordance with one example. Memory controller 200 of FIG. 2 may be used to implement the various steps for the predictor query flow 300 for implementing the address-based dynamic page close policy. In this example, the principle behind the predictor is to reference the historical behavior of the page to predict whether more page hits are expected. If the current hit tracker (CHT) counter value is equal to or has exceeded the historical prediction, the predictor will recommend closing the page as it believes no more page hits are expected. Otherwise, the predictor will recommend keeping the page open. As part of step 302, a request is made to query the predictor with an address X, where the address X corresponds to the system memory address associated with a memory request. As explained earlier, the system memory address is only one example of an address that can be used. Step 304 corresponds to calculating hash(X). In one example, hash logic 232 associated with control system 230 can be used to calculate the hash, which acts as an index for the entries into a tracker (e.g., the tracker shown in Table 1 earlier).

With continued reference to FIG. 3, step 306 includes determining whether hash(X) exists in the AWHT. If the entry corresponding to hash(X) exists in the AWHT, this means that there is already history that is being tracked for the system memory address X. In this case, at step 310, the threshold value (THRESHOLD) (later to be compared with the counter value for the CHT) is set to be equal to the value of the AWHT counter corresponding to the hash(X) index value. On the other hand, if the entry corresponding to hash(X) does not exist in the AWHT, this means that there is no history being tracked at this time for the system memory address X. In this case, at step 312, the threshold value (THRESHOLD) (later to be compared with the counter value for the CHT) is set to be equal to the value of the UWHT counter corresponding to the physical memory region (e.g., a bank, a bankgroup, or a rank (e.g., a set of physical memories associated with a channel controller that share a common address/data connection)).

After the threshold value is set to either the AWHT counter value or the UWHT counter value, at step 314 the predictor compares the CHT counter value corresponding to the hash(X) index value to the threshold value to determine whether the CHT counter value (CHT(HASH(X))) is equal to or greater than the current threshold (THRESHOLD). If the answer is yes, then this means that having evaluated the historical behavior of the page being accessed, more page hits are not expected. Accordingly, as part of step 316, the predictor recommends a decision to close the page. Having made this recommendation, the predictor at step 320 sets the value of the AWHT counter (AWHT(HASH(X))) equal to the CHT counter value (CHT(HASH(X))). This way a historical record concerning page hits to the page is created for subsequent usage by the predictor. On the other hand, if the CHT counter value (CHT(HASH(X))) is lower than the current threshold (THRESHOLD), then in step 318, the predictor recommends a decision to keep the page open. This is because based on the historical behavior of the page, the predictor believes that more page hits to the page are expected. In sum, the historical pattern of accesses to the page for specific system memory addresses is used to recommend closing the page or keeping the page open. By leveraging this insight, the predictor should be able to customize the page close algorithm for the traffic pattern being observed and achieve accuracy closer to an ideal page close algorithm. Although FIG. 3 shows certain steps being performed in a certain order as part of flow 300, additional or fewer steps in a different order may also be performed to achieve similar results.

Figure 4:
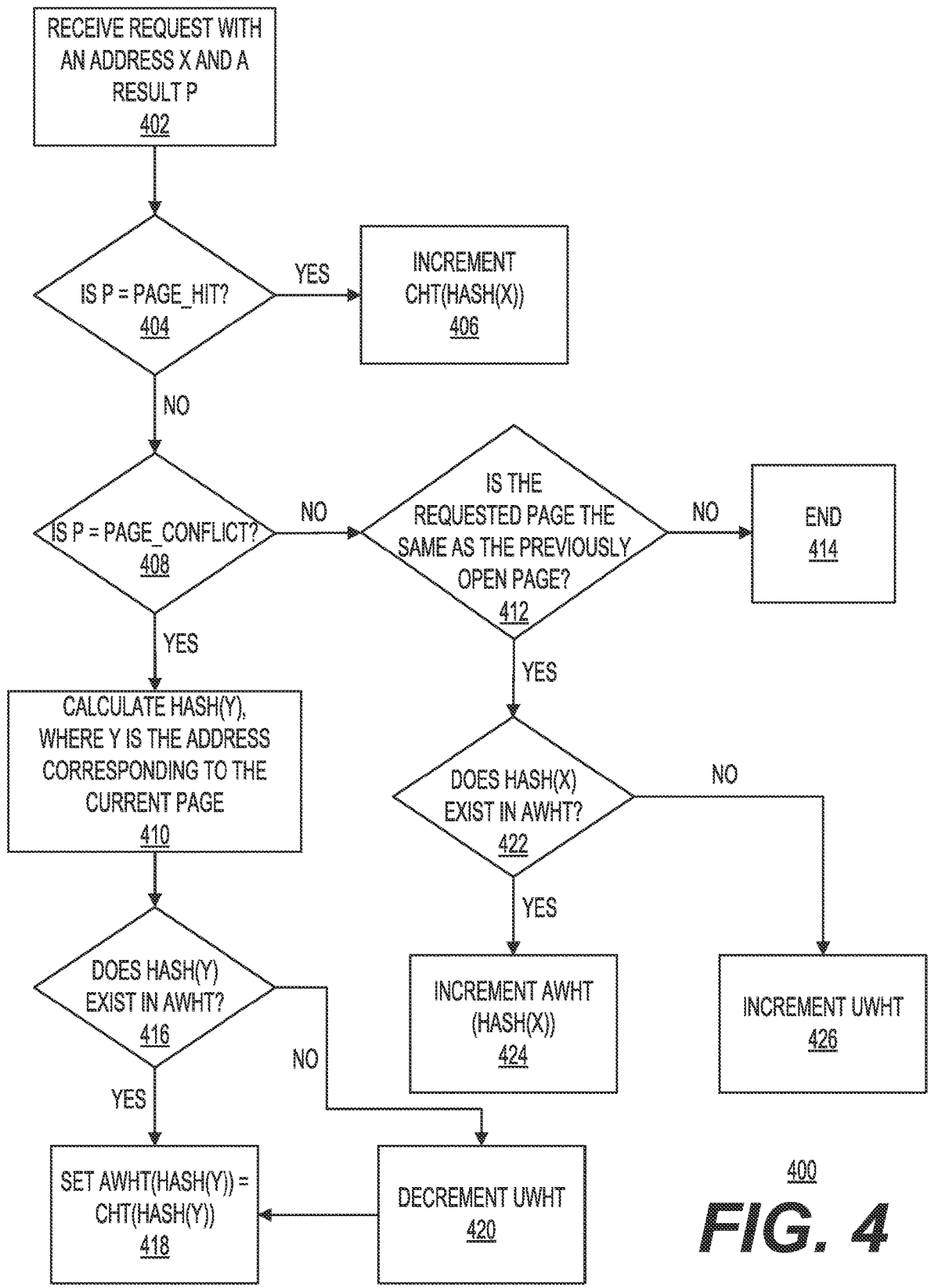
FIG. 4 shows a tracker update flow for implementing the address-based dynamic page close policy in accordance with one example.

FIG. 4 shows a tracker update flow 400 for implementing the address-based dynamic page close policy in accordance with one example. Memory controller 200 of FIG. 2 may be used to implement the various steps for the tracker update flow 400 for implementing the address-based dynamic page close policy. The update flow captures any phase changes in the execution of an application. This is because an application may have long periods of similar behavior, but then at a certain time, the behavior with respect to memory accesses may change. The predictor described earlier takes feedback for its recommendations from the update flow and adjusts the future predictions. The predictor update is invoked with the bank and page information along with the feedback regarding whether the prediction for this particular page was overdue or premature. If the prediction was overdue, the predictor updates the threshold in the AWHT or the UWHT to be more aggressive (e.g., it reduces the value of the threshold). On the other hand, if the prediction was premature the threshold is updated to be more conservative (e.g., the predictor increases the value of the threshold).

As part of the updating of the trackers, an allocation into the AWHT happens in two scenarios. The first case is whenever the predictor determines that a page should be closed, and the second case is when the overdue feedback is received. In both cases, the AWHT entry is updated with the value from CHT(hash(X)). The goal is to ensure that the AWHT contains the last known hit count for a particular entry. The CHT is reset whenever a new page is opened in a bank. This could happen due to a page empty or a page conflict scenario. Similarly, the CHT is incremented every time a page hit scenario occurs.

With continued reference to FIG. 4, at step 402, the request with an address X, where the address X corresponds to the system memory address associated with a memory request, and the result P (e.g., a page hit, a page miss, or a page conflict) is received. As explained earlier, the system memory address is only one example of an address that can be used. At step 404, if the result P is determined to be a page hit, then at step 406, the CHT counter value (CHT(HASH (X)) for the address X is incremented. On the other hand, if the page result is not a page hit, then at step 408, the predictor determines whether the result P corresponds to a page conflict scenario. If the result P corresponds to a page conflict scenario, then at step 410, the predictor calculates hash (Y), where Y is the address corresponding to the current page. Next, at step 416, the predictor determines whether hash (Y) exists in the AWHT. If the answer is yes, then at step 418, the predictor sets the value of the AWHT counter (AWHT(HASH(Y))) equal to the CHT counter value (CHT (HASH(Y))). This way a historical record concerning page hits to the page Y is created for subsequent usage by the predictor.

If on the other hand, the answer at step 416 is a no, then the predictor, at step 420, decrements the UWHT counter value for the physical memory region (e.g., the bank, the bankgroup, or the rank), and then the flow proceeds to step 418 described earlier. The flow 400 proceeds to step 418 because it allows the predictor to create history for address Y for future usage. Thus, the next time the predictor receives a query for address Y, the predictor need not rely upon the UWHT counter value for the physical memory region; instead, the predictor can rely upon historical usage information that is specific for address Y.

Still referring to FIG. 4, if the result P does not correspond to a page conflict scenario, then at step 412, the predictor determines whether the requested page is the same as the previously open page. If the requested page is the same as the previously open page (it was open earlier, but was closed prematurely), this would mean that instead of a page hit scenario, a page empty scenario unfolded and so the trackers would need to be adjusted. If the requested page is not the same as the previously open page, then at step 414, the tracker update flow ends because no trackers need to be adjusted at this stage of the flow.

If at step 412, the predictor determines that the requested page is the same as the previously open page, then at step 422, the predictor determines whether hash(X) exists in the AWHT. If the answer is yes, then at step 424 the predictor increments the corresponding AWHT counter value (AWHT (HASH(X))). If on the other hand, if the answer is no (i.e., hash(X) does not exist in the AWHT), then at step 426, the predictor increments the corresponding UWHT counter value. Although FIG. 4 shows certain steps being performed in a certain order as part of flow 400, additional or fewer steps in a different order may also be performed to achieve similar results.

The predictor flow 300 of FIG. 3 and the tracker update flow 400 of FIG. 4 for implementing the address-based dynamic page close policy may be modified by adding epoch-based capabilities to these flows. As part of this capability, the predictor operates in a training phase and an inference phase. Each epoch may be defined in terms of the number of accesses seen by the predictor. In the context of this predictor, during the training phase the address aware history tracker (AWHT) and the unaware history tracker (UWHT) are updated as described earlier. At the end of each epoch, the state of these trackers is frozen and copied over. In the subsequent epoch, the training phase is now free to overwrite the AWHT and the UWHT with the new epoch's values. The inference phase will use the values that were captured at the end of the previous epoch to make predictions for the current epoch. In this manner, the epoch-based design introduces a certain amount of hysteresis in the system. Note that an epoch based design can be implemented without the loss of generality. A small epoch can simulate the behavior of a non-epoch based design.

FIG. 5 shows a flow chart 500 for implementing a dynamic page close policy for a physical memory region in accordance with one example. The steps described with respect to flow chart 500 may be performed using memory controller 200 of FIG. 2. Step 510 includes using a first tracker, having entries indexed by a hash of system memory addresses for a physical memory region of a memory system, tracking page hits associated with the physical memory region to develop a historical record of page hits to the physical memory region. As explained earlier, the address aware history tracker (AWHT) is an example of a tracker that is indexed by a hash of the system memory addresses. As part of the flows described earlier with respect to FIGS. 3 and 4, as an example, the AWHT is used to keep track of the historical behavior of a page for a given system memory address, and is updated to provide feedback to the predictor. In addition, as explained earlier, the physical memory region corresponds to a bank, a bankgroup, or a rank associated with the memory system.

Step 520 includes using a second tracker, different from the first tracker, having entries indexed by a hash of system memory addresses for the physical memory region, tracking page hits to the physical memory region to develop a current record of page hits to the physical memory region. As explained earlier, as an example, the current hit tracker (CHT) is an example of tracker that is indexed by a hash of the system memory addresses. As part of the flows described earlier with respect to FIGS. 3 and 4, as an example, the CHT is used to keep track of the real time count of page hits for each open/active bank.

Step 530 includes predicting whether to close a page or keep the page open based on a comparison of the historical record of page hits to the physical memory region with the current record of page hits to the physical memory region. As explained earlier with respect to flow 300 of FIG. 3, the predictor sets a threshold value to either the address aware history tracker (AWHT) counter value or the unaware history tracker (UWHT) counter value. Then, at step 314 of FIG. 3, the predictor compares the CHT counter value corresponding to the hash(X) index value to the threshold value to determine whether the CHT counter value (CHT(HASH(X))) is equal to or greater than the current threshold (THRESHOLD). If the answer is yes, then this means that having evaluated the historical behavior of the page being accessed, more page hits are not expected. Accordingly, as part of step 316 of FIG. 3, the predictor recommends a decision to close the page. On the other hand, if the CHT counter value (CHT(HASH(X))) is lower than the current threshold (THRESHOLD), then in step 318 of FIG. 3, the predictor recommends a decision to keep the page open. This is because based on the historical behavior of the page, the predictor believes that more page hits to the page are expected. In sum, the historical pattern of accesses to the page for specific system memory addresses is used to recommend closing the page or keeping the page open. Although FIG. 5 shows certain steps being performed in a certain order as part of flow chart 500, additional or fewer steps in a different order may also be performed to achieve similar results.

FIG. 6 shows a flow chart 600 for implementing a dynamic page close policy for a physical memory region in accordance with one example. The steps described with respect to flow chart 600 may be performed using memory controller 200 of FIG. 2. Step 610 includes using a first tracker, having entries indexed by a hash of system memory addresses for the physical memory region, tracking page hits associated with the physical memory region to develop a historical record of page hits to the physical memory region. As explained earlier, the address aware history tracker (AWHT) is an example of a tracker that is indexed by a hash of the system memory addresses. As part of the flows described earlier with respect to FIGS. 3 and 4, as an example, the AWHT is used to keep track of the historical behavior of a page for a given system memory address and is updated to provide feedback to the predictor. In addition, as explained earlier, the physical memory region corresponds to a bank, a bankgroup, or a rank associated with the memory system.

Step 620 includes using a second tracker, different from the first tracker, having entries indexed by a hash of the system memory addresses for the physical memory region, tracking page hits to the physical memory region to develop a current record of page hits to the physical memory region. As explained earlier, as an example, the current hit tracker (CHT) is an example of tracker that is indexed by a hash of the system memory addresses. As part of the flows described earlier with respect to FIGS. 3 and 4, as an example, the CHT is used to keep track of the real time count of page hits for each open/active bank.

Step 630 includes using a third tracker, different from the first tracker and the second tracker, tracking page hits related to system memory addresses not having an indexed entry into the first tracker. As explained earlier, the address unaware history tracker (UWHT) is a fallback predictor for those cases when the hash(X), where X is the incoming address, is not present in the AWHT. In an example, the function of the UWHT is like the AWHT except that it is a single counter agnostic of the accessed address. The other distinction regarding the UWHT is that it is only incremented for page hits that are a miss in the AWHT.

Step 640 includes setting a threshold equal to a value of the entry in the first tracker if there is an entry in the first tracker having entries indexed by the hash of the system memory addresses for the physical memory region, otherwise setting the threshold equal to a value of the third tracker. As explained earlier with respect to flow 300 of FIG. 3, the predictor sets a threshold value to either the address aware history tracker (AWHT) counter value or the unaware history tracker (UWHT) counter value.

Step 650 includes predicting whether to close the page or keep the page open based on a comparison of the threshold with the current record of page hits to the physical memory region. As explained earlier, at step 314 of FIG. 3, the predictor compares the CHT counter value corresponding to the hash(X) index value to the threshold value to determine whether the CHT counter value (CHT(HASH(X))) is equal to or greater than the current threshold (THRESHOLD). If the answer is yes, then this means that having evaluated the historical behavior of the page being accessed, more page hits are not expected. Accordingly, as part of step 316 of FIG. 3, the predictor recommends a decision to close the page. On the other hand, if the CHT counter value (CHT(HASH(X))) is lower than the current threshold (THRESHOLD), then in step 318 of FIG. 3, the predictor recommends a decision to keep the page open. This is because based on the historical behavior of the page, the predictor believes that more page hits to the page are expected. In sum, the historical pattern of accesses to the page for specific system memory addresses is used to recommend closing the page or keeping the page open. Although FIG. 6 shows certain steps being performed in a certain order as part of flow chart 600, additional or fewer steps in a different order may also be performed to achieve similar results. Advantageously, the memory controller and the methods described herein help improve memory performance by increasing the page hit rate. The increased page hit rate lowers the latency of memory requests. In addition, power savings can be realized by placing memory regions (e.g., banks) in an idle state based on the improved dynamic page close policy.

In conclusion, the present disclosure relates to a method for implementing a dynamic page close policy for a physical memory region of a memory system. The method may include using a first tracker, having entries indexed by a hash of system memory addresses for the physical memory region, tracking page hits associated with the physical memory region to develop a historical record of page hits to the physical memory region.

The method may further include using a second tracker, different from the first tracker, having entries indexed by a hash of system memory addresses for the physical memory region, tracking page hits to the physical memory region to develop a current record of page hits to the physical memory region. The method may further include predicting whether to close a page or keep the page open based on a comparison of the historical record of page hits to the physical memory region with the current record of page hits to the physical memory region.

The method may further comprise predicting to close the page when the comparison of the historical record of the page hits to the physical memory region with the current record of the page hits to the physical memory region indicates that no additional page hits to the page are expected. The physical memory region may correspond to a bank, a bankgroup, or a rank associated with the memory system. The method may further comprise configuring a size of the physical memory region, a number of trackers associated with the physical memory region, and a size of each of the trackers associated with the physical memory region.

The method may further comprise after predicting whether to close the page or keep the page open, requesting feedback indicative of whether the prediction to close the page being overdue or premature. The method may further comprise updating the first tracker: (1) after predicting to close the page, or (2) when the feedback is indicative of the prediction to close the page is overdue. The method may further comprise resetting the second tracker whenever a new page corresponding to the physical memory region is opened.

In another example, the present disclosure relates to a memory controller for implementing a dynamic page close policy for a physical memory region of a memory system. The memory controller may include a first tracker, having entries indexed by a hash of system memory addresses for a physical memory region, to track page hits associated with the physical memory region to develop a historical record of page hits to the physical memory region.

The memory controller may further include a second tracker, different from the first tracker, having entries indexed by a hash of system memory addresses for the physical memory region, to track page hits to the physical memory region to develop a current record of page hits to the physical memory region. The memory controller may further include a predictor to predict whether to close the page or keep the page open based on a comparison of the historical record of page hits to the physical memory region with the current record of page hits to the physical memory region.

The physical memory region may correspond to a bank, a bankgroup, or a rank associated with the memory system. As part of the system, each of: (1) a size of the physical memory region, (2) a number of trackers associated with the physical memory region, and (3) a size of each of the trackers associated with the physical memory region is programmable.

The predictor may further be configured to, after predicting whether to close the page or keep the page open, request feedback indicative of whether the prediction to close the page being overdue or premature. The first tracker may be updated: (1) after predicting to close the page, or (2) when the feedback is indicative of the prediction to close the page is overdue. The second tracker may be reset whenever a new page corresponding to the physical memory region is opened.

In yet another example, the present disclosure relates to a method for implementing a dynamic page close policy for a physical memory region of a memory system. The method may include using a first tracker, having entries indexed by a hash of system memory addresses for the physical memory region, tracking page hits associated with the physical memory region to develop a historical record of page hits to the physical memory region. The method may include using a second tracker, different from the first tracker, having entries indexed by a hash of the system memory addresses for the physical memory region, tracking page hits to the physical memory region to develop a current record of page hits to the physical memory region.

The method may further include using a third tracker, different form the first tracker and the second tracker, tracking page hits related to system memory addresses not having an indexed entry into the first tracker. The method may further include setting a threshold equal to a value of the entry in the first tracker if there is an entry in the first tracker having entries indexed by the hash of the system memory addresses for the physical memory region, otherwise setting the threshold equal to a value of the third tracker. The method may further include predicting whether to close the page or keep the page open based on a comparison of the threshold with the current record of page hits to the physical memory region.

The physical memory region may correspond to a bank, a bankgroup, or a rank associated with the memory system. The method may further comprise configuring a size of the physical memory region, a number of trackers associated with the physical memory region, and a size of each of the trackers associated with the physical memory region.

The method may further comprise after predicting whether to close the page or keep the page open, requesting feedback indicative of whether the prediction to close the page is overdue or premature. The method may further comprise lowering the threshold when the feedback is indicative of the prediction to close the page being overdue. The method may further comprise increasing the threshold when the feedback is indicative of the prediction to close the page being premature. The method may further comprise resetting the second tracker whenever a new page corresponding to the physical memory region is opened.

It is to be understood that the methods, modules, and components depicted herein are merely exemplary. Alternatively, or in addition, the functionality described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), and Complex Programmable Logic Devices (CPLDs). In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality. Merely because a component, which may be an apparatus, a structure, a system, or any other implementation of a functionality, is described herein as being coupled to another component does not mean that the components are necessarily separate components. As an example, a component A described as being coupled to another component B may be a sub-component of the component B, the component B may be a sub-component of the component A, or components A and B may be a combined sub-component of another component C.

The functionality associated with some examples described in this disclosure can also include instructions stored in a non-transitory media. The term "non-transitory media" as used herein refers to any media storing data and/or instructions that cause a machine to operate in a specific manner. Exemplary non-transitory media include non-volatile media and/or volatile media. Non-volatile media include, for example, a hard disk, a solid-state drive, a magnetic disk or tape, an optical disk or tape, a flash memory, an EPROM, NVRAM, PRAM, or other such media, or networked versions of such media. Volatile media include, for example, dynamic memory such as DRAM, SRAM, a cache, or other such media. Non-transitory media is distinct from, but can be used in conjunction with transmission media. Transmission media is used for transferring data and/or instruction to or from a machine. Exemplary transmission media include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:

1. A method comprising:
using a first tracker, having entries indexed by a hash of system memory addresses for a physical memory region of a memory system, tracking page hits associated with the physical memory region to develop a historical record of page hits to the physical memory region;
using a second tracker, different from the first tracker, having entries indexed by a hash of system memory addresses for the physical memory region, tracking page hits to the physical memory region to develop a current record of page hits to the physical memory region; and
predicting whether to close a page or keep the page open based on a comparison of the historical record of page hits to the physical memory region with the current record of page hits to the physical memory region.

2. The method of claim 1, further comprising predicting to close the page when the comparison of the historical record of the page hits to the physical memory region with the current record of the page hits to the physical memory region indicates that no additional page hits to the page are expected.

3. The method of claim 1, wherein the physical memory region corresponds to a bank, a bankgroup, or a rank associated with the memory system.

4. The method of claim 1, further comprising configuring a size of the physical memory region, a number of trackers associated with the physical memory region, and a size of each of the trackers associated with the physical memory region.

5. The method of claim 1, further comprising, after predicting whether to close the page or keep the page open, requesting feedback indicative of whether the prediction to close the page being overdue or premature.

6. The method of claim 5, further comprising updating the first tracker: (1) after predicting to close the page, or (2) when the feedback is indicative of the prediction to close the page is overdue.

7. The method of claim 1, further comprising resetting the second tracker whenever a new page corresponding to the physical memory region is opened.

8. A memory controller comprising:
a first tracker, having entries indexed by a hash of system memory addresses for a physical memory region, to track page hits associated with the physical memory region to develop a historical record of page hits to the physical memory region;
a second tracker, different from the first tracker, having entries indexed by a hash of system memory addresses for the physical memory region, to track page hits to the physical memory region to develop a current record of page hits to the physical memory region; and
a predictor to predict whether to close the page or keep the page open based on a comparison of the historical record of page hits to the physical memory region with the current record of page hits to the physical memory region.

9. The memory controller of claim 8, wherein the physical memory region corresponds to a bank, a bankgroup, or a rank associated with the memory system.

10. The memory controller of claim 8, wherein each of: (1) a size of the physical memory region, (2) a number of trackers associated with the physical memory region, and (3) a size of each of the trackers associated with the physical memory region is programmable.

11. The memory controller of claim 8, wherein the predictor is further configured to, after predicting whether to close the page or keep the page open, request feedback indicative of whether the prediction to close the page being overdue or premature.

12. The memory controller of claim 11, wherein the first tracker is updated: (1) after predicting to close the page, or (2) when the feedback is indicative of the prediction to close the page is overdue.

13. The memory controller of claim 12, wherein the second tracker is reset whenever a new page corresponding to the physical memory region is opened.

14. A method for implementing a dynamic page close policy for a physical memory region of a memory system, the method comprising:
   using a first tracker, having entries indexed by a hash of system memory addresses for the physical memory region, tracking page hits associated with the physical memory region to develop a historical record of page hits to the physical memory region;
   using a second tracker, different from the first tracker, having entries indexed by a hash of the system memory addresses for the physical memory region, tracking page hits to the physical memory region to develop a current record of page hits to the physical memory region;
   using a third tracker, different from the first tracker and the second tracker, tracking page hits related to system memory addresses not having an indexed entry into the first tracker;
   setting a threshold equal to a value of the entry in the first tracker if there is an entry in the first tracker having entries indexed by the hash of the system memory addresses for the physical memory region, otherwise setting the threshold equal to a value of the third tracker; and
   predicting whether to close the page or keep the page open based on a comparison of the threshold with the current record of page hits to the physical memory region.

15. The method of claim 14, wherein the physical memory region corresponds to a bank, a bankgroup, or a rank associated with the memory system.

16. The method of claim 14, further comprising configuring a size of the physical memory region, a number of trackers associated with the physical memory region, and a size of each of the trackers associated with the physical memory region.

17. The method of claim 14, further comprising, after predicting whether to close the page or keep the page open, requesting feedback indicative of whether the prediction to close the page is overdue or premature.

18. The method of claim 17, further comprising lowering the threshold when the feedback is indicative of the prediction to close the page being overdue.

19. The method of claim 17, further comprising increasing the threshold when the feedback is indicative of the prediction to close the page being premature.

20. The method of claim 14, further comprising resetting the second tracker whenever a new page corresponding to the physical memory region is opened.

* * * * *